United States Patent
Norris et al.

(10) Patent No.: US 7,201,558 B2
(45) Date of Patent: Apr. 10, 2007

(54) SEAL ARRANGEMENT FOR A FAN-TURBINE ROTOR ASSEMBLY

(75) Inventors: James W. Norris, Lebanon, CT (US); Craig A. Nordeen, Manchester, CT (US); Gary Roberge, Tolland, CT (US); Gabriel Suciu, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 176 days.

(21) Appl. No.: 11/122,368

(22) Filed: May 5, 2005

(65) Prior Publication Data

US 2006/0251508 A1   Nov. 9, 2006

(51) Int. Cl.
F04D 31/00   (2006.01)

(52) U.S. Cl. .................... 415/110; 415/116; 416/219 R (58) Field of Classification Search ................ 415/110, 415/111, 112, 115, 116; 416/219 R, 220 R, 416/222, 232

See application file for complete search history.

(56) References Cited

U.S. PATENT DOCUMENTS

| | | | |
|---|---|---|---|
| 3,269,120 A | | 8/1966 | Sabatiuk |
| 3,363,419 A | * | 1/1968 | Wilde .......................... 415/119 |
| 3,572,960 A | * | 3/1971 | McBride ....................... 415/115 |
| 3,735,593 A | * | 5/1973 | Howell ......................... 415/115 |
| 3,801,222 A | * | 4/1974 | Violette .................. 416/220 R |
| 3,836,279 A | | 9/1974 | Lee |
| 4,265,595 A | * | 5/1981 | Bucy et al. ............. 416/220 R |
| 5,501,575 A | | 3/1996 | Eldredge et al. |

FOREIGN PATENT DOCUMENTS

DE   196 44 543 A1   4/1998
WO   WO2004/092567 A   10/2004

OTHER PUBLICATIONS

PCT International Search Report, mailed Aug. 17, 2006.

* cited by examiner

*Primary Examiner*—Igor Kershteyn
(74) *Attorney, Agent, or Firm*—Carlson, Gaskey & Olds (57) ABSTRACT

A fan-turbine rotor hub includes an outer periphery scalloped by a multitude of elongated openings. Each elongated opening defines an inducer receipt section to receive an inducer section and a hollow fan blade section. An inducer exit from each inducer section is located adjacent a core airflow passage within each fan blade section to provide communication therebetween. A seal is located between an inner fan blade mount and a blade receipt section to minimize airflow leakage between the inducer exit and the core airflow passage.

13 Claims, 9 Drawing Sheets

SEAL ARRANGEMENT FOR A FAN-TURBINE ROTOR ASSEMBLY

BACKGROUND OF THE INVENTION

The present invention relates to a tip turbine engine, and more particularly to a fan-turbine rotor assembly with a mechanical retention and sealing arrangement between each of a multiple of hollow fan blades.

An aircraft gas turbine engine of the conventional turbofan type generally includes a forward bypass fan, a compressor, a combustor, and an aft turbine all located along a common longitudinal axis. A compressor and a turbine of the engine are interconnected by a shaft. The compressor is rotatably driven to compress air entering the combustor to a relatively high pressure. This pressurized air is then mixed with fuel in a combustor and ignited to form a high energy gas stream. The gas stream flows axially aft to rotatably drive the turbine which rotatably drives the compressor through the shaft. The gas stream is also responsible for rotating the bypass fan. In some instances, there are multiple shafts or spools. In such instances, there is a separate turbine connected to a separate corresponding compressor through each shaft. In most instances, the lowest pressure turbine will drive the bypass fan.

Although highly efficient, conventional turbofan engines operate in an axial flow relationship. The axial flow relationship results in a relatively complicated elongated engine structure of considerable longitudinal length relative to the engine diameter. This elongated shape may complicate or prevent packaging of the engine into particular applications.

A recent development in gas turbine engines is the tip turbine engine. Tip turbine engines locate an axial compressor forward of a bypass fan which includes hollow fan blades that receive airflow from the axial compressor therethrough such that the hollow fan blades operate as a centrifugal compressor. Compressed core airflow from the hollow fan blades is mixed with fuel in an annular combustor and ignited to form a high energy gas stream which drives the turbine integrated onto the tips of the hollow bypass fan blades for rotation therewith as generally disclosed in U.S. Patent Application Publication Nos.: 20030192303; 20030192304; and 20040025490.

The tip turbine engine provides a thrust to weight ratio equivalent to conventional turbofan engines of the same class within a package of significantly shorter length.

One significant rotational component of a tip turbine engine is the fan-turbine rotor assembly. The fan-turbine rotor assembly includes components that rotate at relatively high speeds to generate bypass airflow while communicating a core airflow through each of the multitude of hollow fan blades. A large percentage of the expense associated with a tip turbine engine is the manufacture of the fan-turbine rotor assembly to minimize airflow loss through each of the multitude of hollow fan blades.

Accordingly, it is desirable to provide an assembly arrangement for a fan-turbine rotor assembly that is relatively inexpensive to manufacture yet provides a high degree of reliability and minimal airflow loss.

SUMMARY OF THE INVENTION

A fan-turbine rotor assembly for a tip turbine engine according to the present invention includes a fan hub which has an outer periphery scalloped by a multitude of elongated openings. Each elongated opening defines an inducer receipt section to receive an inducer section and a blade receipt section to retain a hollow fan blade section. The blade receipt section retains each of the hollow fan blade sections adjacent each inducer section. An inner fan blade mount is located adjacent an inducer exit of each inducer section to provide a core airflow communication path from the inducer passages within each inducer section into the core airflow passage within each fan blade section.

A seal is located between the inner fan blade mount and the blade receipt section to minimize airflow leakage therebetween. The seal also engages the inducer exit of each inducer section to minimize leakage of airflow from the inducer section into the core airflow passage of each hollow fan blade section and to accommodate tolerance variations therebetween.

The present invention therefore provides an assembly arrangement for a fan-turbine rotor assembly, which is relatively inexpensive to manufacture yet provides a high degree of reliability and minimal airflow loss.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
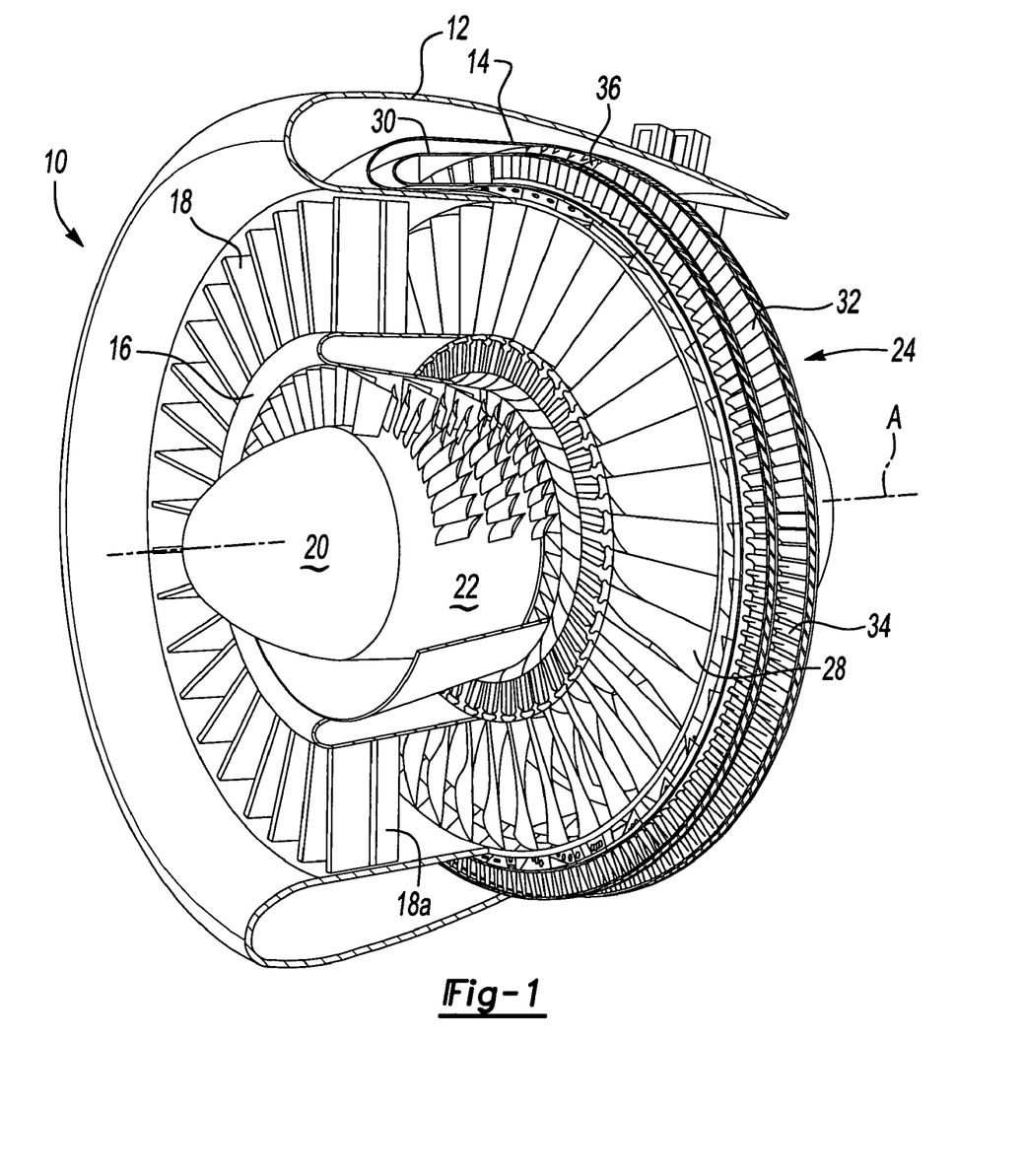
FIG. 1 is a partial sectional perspective view of a tip turbine engine.

FIG. 1 illustrates a general perspective partial sectional view of a tip turbine engine type gas turbine engine 10. The engine 10 includes an outer nacelle 12, a nonrotatable static outer support structure 14 and a nonrotatable static inner support structure 16. A multitude of fan inlet guide vanes 18 are mounted between the static outer support structure 14 and the static inner support structure 16. Each inlet guide vane preferably includes a variable trailing edge 18A.

A nose cone 20 is preferably located along the engine centerline A to smoothly direct airflow into an axial compressor 22 adjacent thereto. The axial compressor 22 is mounted about the engine centerline A behind the nose cone 20.

A fan-turbine rotor assembly 24 is mounted for rotation about the engine centerline A aft of the axial compressor 22. The fan-turbine rotor assembly 24 includes a multitude of hollow fan blades 28 to provide internal, centrifugal compression of the compressed airflow from the axial compressor 22 for distribution to an annular combustor 30 located within the nonrotatable static outer support structure 14.

A turbine 32 includes a multitude of tip turbine blades 34 (two stages shown) which rotatably drive the hollow fan blades 28 relative to a multitude of tip turbine stators 36 which extend radially inwardly from the static outer support structure 14. The annular combustor 30 is axially forward of the turbine 32 and communicates with the turbine 32.

Figure 2:
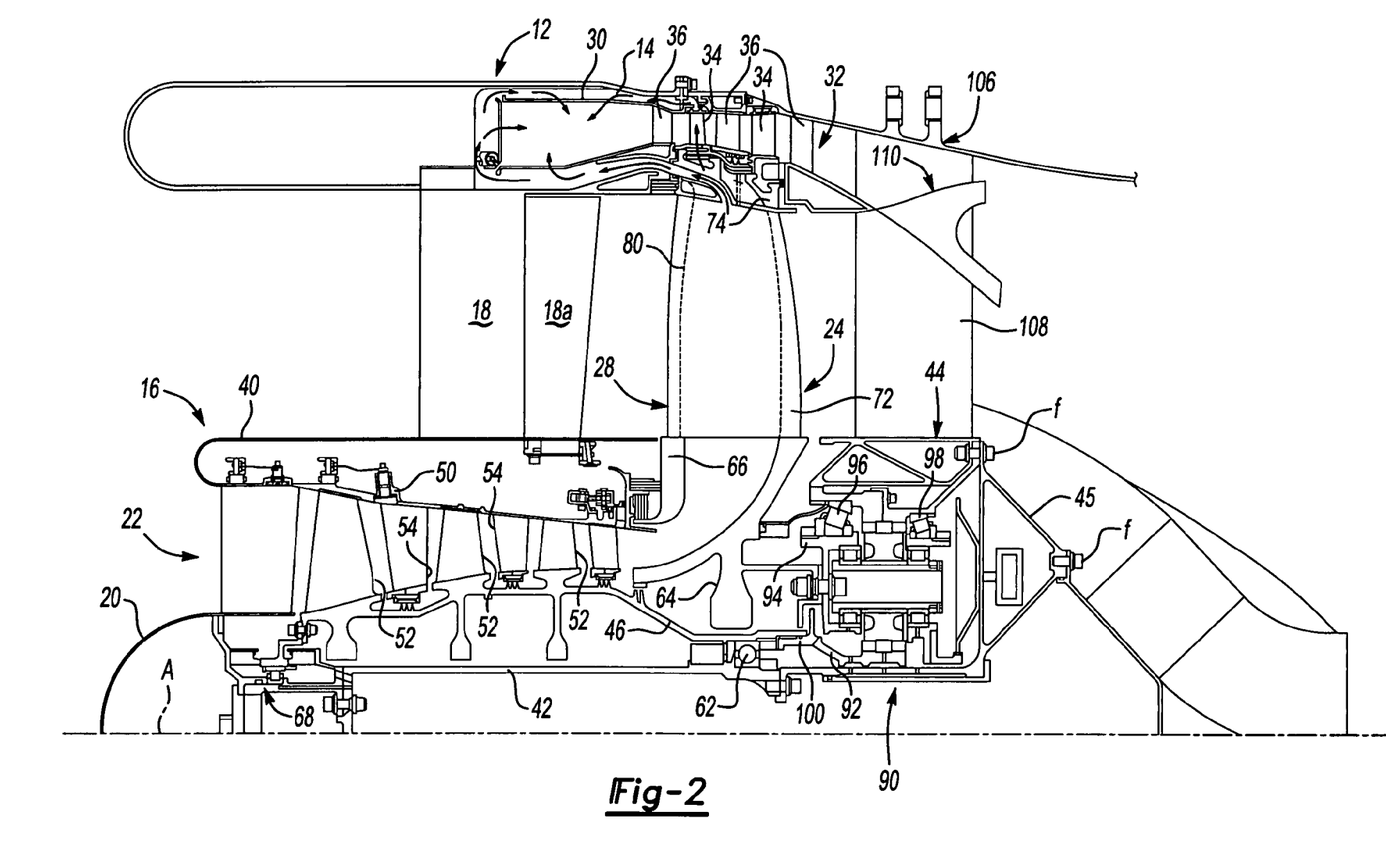
FIG. 2 is a longitudinal sectional view of a tip turbine engine along an engine centerline.

Referring to FIG. 2, the nonrotatable static inner support structure 16 includes a splitter 40, a static inner support housing 42 and an static outer support housing 44 located coaxial to said engine centerline A.

The axial compressor 22 includes the axial compressor rotor 46 from which a plurality of compressor blades 52 extend radially outwardly and a compressor case 50 fixedly mounted to the splitter 40. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a multitude of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the airflow is turned and diffused toward an axial airflow direction toward the annular combustor 30. Preferably the airflow is diffused axially forward in the engine 10, however, the airflow may alternatively be communicated in another direction.

A gearbox assembly 90 aft of the fan-turbine rotor assembly 24 provides a speed increase between the fan-turbine rotor assembly 24 and the axial compressor 22. Alternatively, the gearbox assembly 90 could provide a speed decrease between the fan-turbine rotor assembly 24 and the axial compressor rotor 46. The gearbox assembly 90 is mounted for rotation between the static inner support housing 42 and the static outer support housing 44. The gearbox assembly 90 includes a sun gear shaft 92 which rotates with the axial compressor 22 and a planet carrier 94 which rotates with the fan-turbine rotor assembly 24 to provide a speed differential therebetween. The gearbox assembly 90 is preferably a planetary gearbox that provides co-rotating or counter-rotating rotational engagement between the fan-turbine rotor assembly 24 and an axial compressor rotor 46. The gearbox assembly 90 is mounted for rotation between the sun gear shaft 92 and the static outer support housing 44 through a forward bearing 96 and a rear bearing 98. The forward bearing 96 and the rear bearing 98 are both tapered roller bearings and both handle radial loads. The forward bearing 96 handles the aft axial loads while the rear bearing 98 handles the forward axial loads. The sun gear shaft 92 is rotationally engaged with the axial compressor rotor 46 at a splined interconnection 100 or the like.

In operation, air enters the axial compressor 22, where it is compressed by the three stages of the compressor blades 52 and compressor vanes 54. The compressed air from the axial compressor 22 enters the inducer section 66 in a direction generally parallel to the engine centerline A and is turned by the inducer section 66 radially outwardly through the core airflow passage 80 of the hollow fan blades 28. The airflow is further compressed centrifugally in the core airflow passage 80 of the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30 and ignited to form a high-energy gas stream. The high-energy gas stream is expanded over the multitude of tip turbine blades 34 mounted about the outer periphery of the fan blades 28 to drive the fan-turbine rotor assembly 24, which in turn drives the axial compressor 22 through the gearbox assembly 90. Concurrent therewith, the fan-turbine rotor assembly 24 discharges fan bypass air axially aft to merge with the core airflow from the turbine 32 in an exhaust case 106. A multitude of exit guide vanes 108 are located between the static outer support housing 44 and the nonrotatable static outer support structure 14 to guide the combined airflow out of the engine 10 to provide forward thrust. An exhaust mixer 110 mixes the airflow from the turbine blades 34 with the bypass airflow through the fan blades 28.

Figure 3:
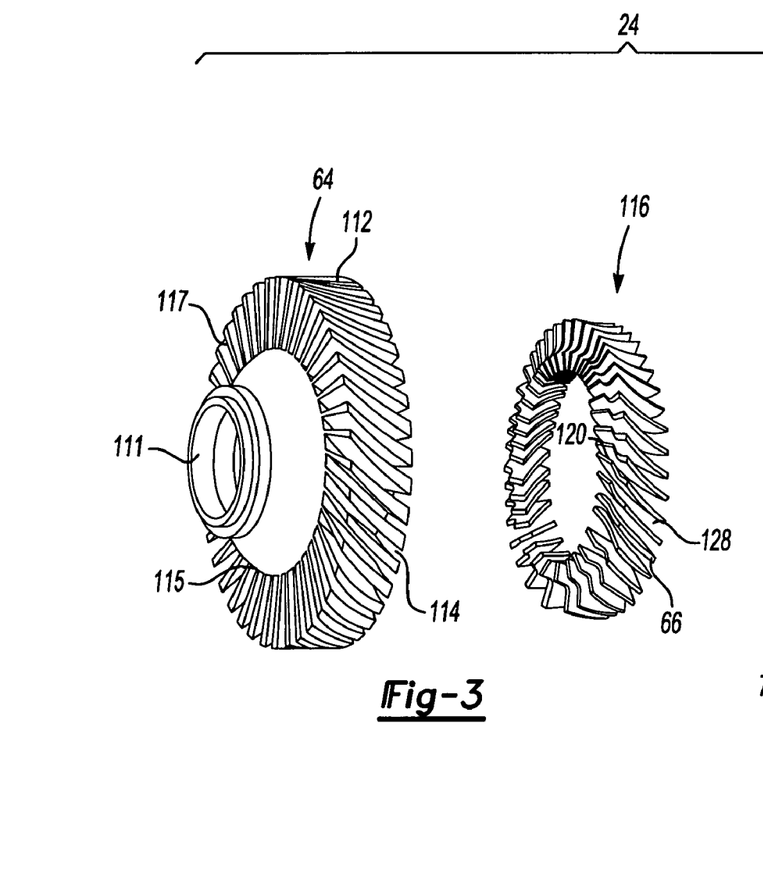
FIG. 3 is an exploded view of a fan-turbine rotor assembly.
Figure 4:
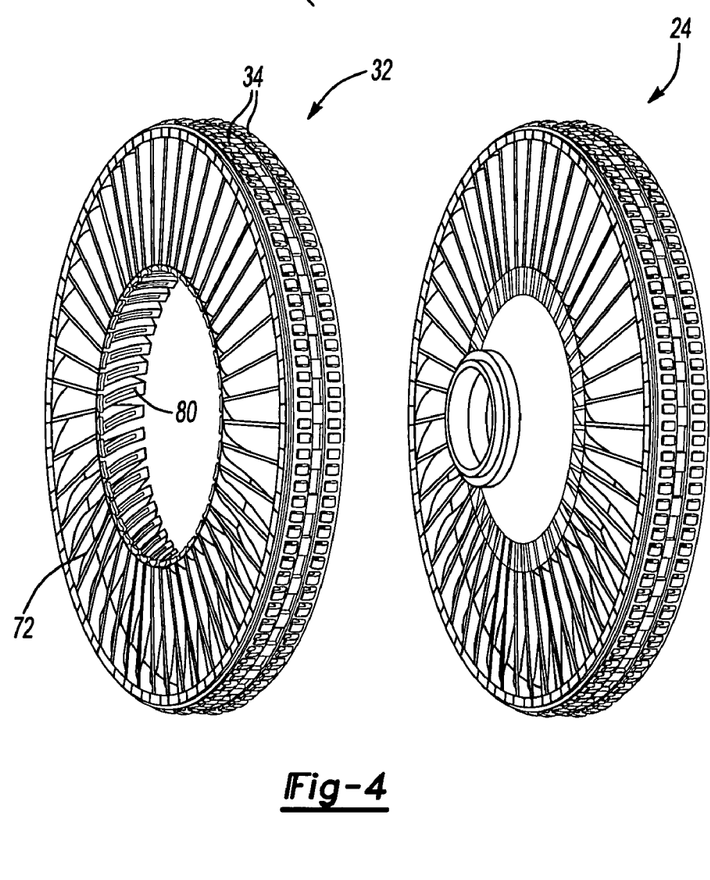
FIG. 4 is an assembled view of a fan-turbine rotor assembly.

Referring to FIG. 3, the fan-turbine rotor assembly 24 is illustrated in an exploded view. The fan hub 64 is the primary structural support of the fan-turbine rotor assembly 24 (FIG. 4). The fan hub 64 is preferably forged and then milled to provide the desired geometry. The fan hub 64 defines a bore 111 and an outer periphery 112. The outer periphery 112 is preferably scalloped by a multitude of elongated openings 114 located about the outer periphery 112. The elongated openings 114 extend into a fan hub web 115.

Each elongated opening 114 defines an inducer receipt section 117 to receive each inducer section 66. The inducer receipt section 117 generally follows the shape of the inducer section 66. That is, the inducer receipt section 117 receives the more complicated shape of the inducer section 66 without the necessity of milling the more complicated shape directly into the fan hub 64.

Figure 5:
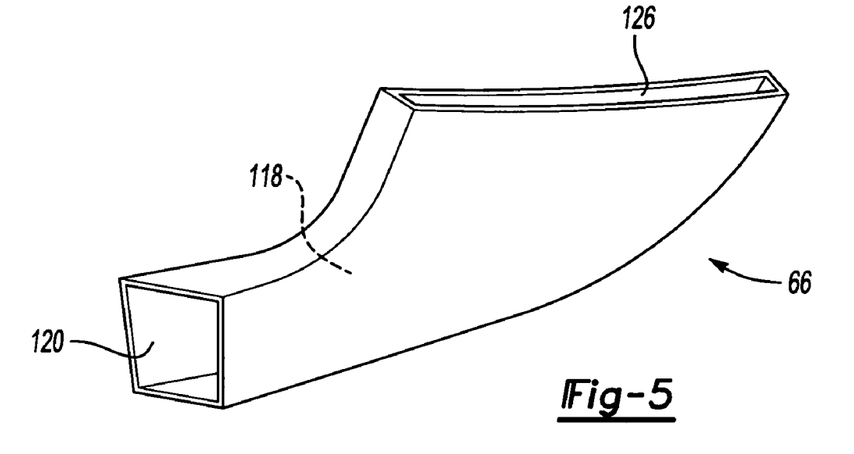
FIG. 5 is an expanded perspective view of an inducer section.

The inducer sections 66 are essentially conduits that define an inducer passage 118 between an inducer inlet 120 and an inducer exit 126 (also illustrated in FIG. 5). Preferably, the inducer sections 66 are formed of a composite material.

Figure 6:
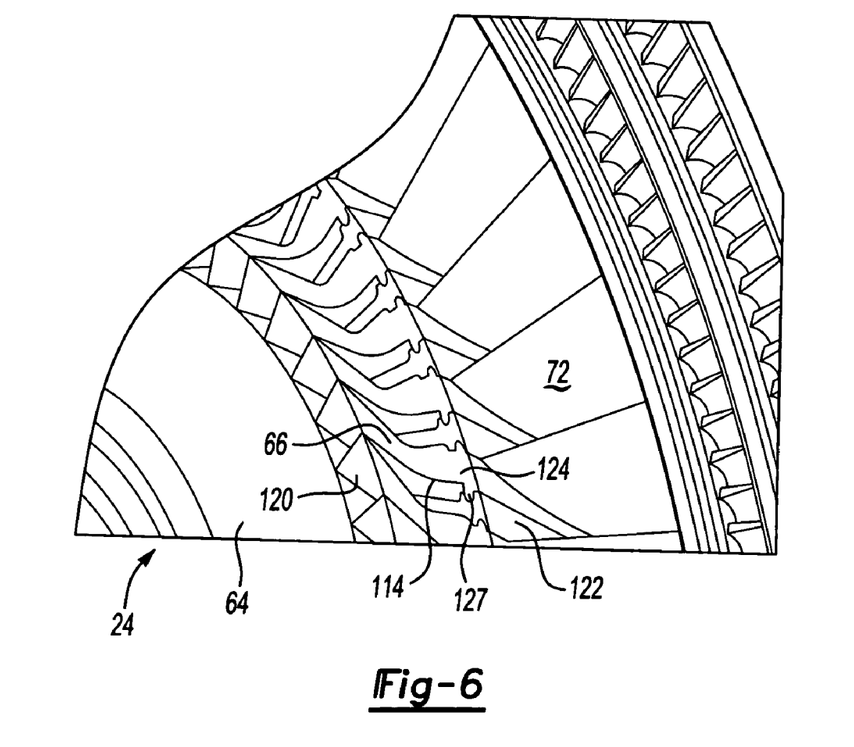
FIG. 6 is an expanded perspective view of the fan-turbine rotor assembly.

The inducer sections 66 together form an inducer 116 of the fan-turbine rotor assembly 24. The inducer inlet 120 of each inducer passage 118 extends forward of the fan hub 64 and is canted toward a rotational direction of the fan hub 64 such that inducer inlet 120 operates as an air scoop during rotation of the fan-turbine rotor assembly 24 (FIG. 6). Each inducer passage 118 provides separate airflow communication to each core airflow passage 80 when each fan blade section 72 is mounted within each elongated opening 114.

Inducer sections 66 are preferably uni-directionally assembled into the fan hub 64 from the front such that the forces exerted upon the fan-turbine rotor assembly 24 during operation correspond with further locking of the inducer sections 66 into the fan hub 64. Each inducer inlet 120 preferably at least partially overlaps the next inducer inlet 120 when assembled into the fan hub 64 (FIG. 6) through the overlapped orientation the inducer inlets 120 lock the inducer sections 66 into the fan hub 64. That is, operational forces maintain the inducer sections 66 within the fan hub 64 in an assembled condition rather than operating to disassemble the components. Alternatively, or in addition the inducer sections 66 may be mounted to the fan hub 64 through an attachment such as bonding, welding, rivets, threaded fasteners, and the like.

Referring to FIG. 6, the fan hub 64 retains each hollow fan blade section 72 within each elongated opening 114 through a blade receipt section 122. The blade receipt section 122 preferably forms an axial semi-cylindrical opening 125 (also illustrated in FIGS. 7A and 7B) formed along the axial length of the elongated openings 114. It should be understood that other retention structures will likewise be usable with the present invention.

Figure 7A:
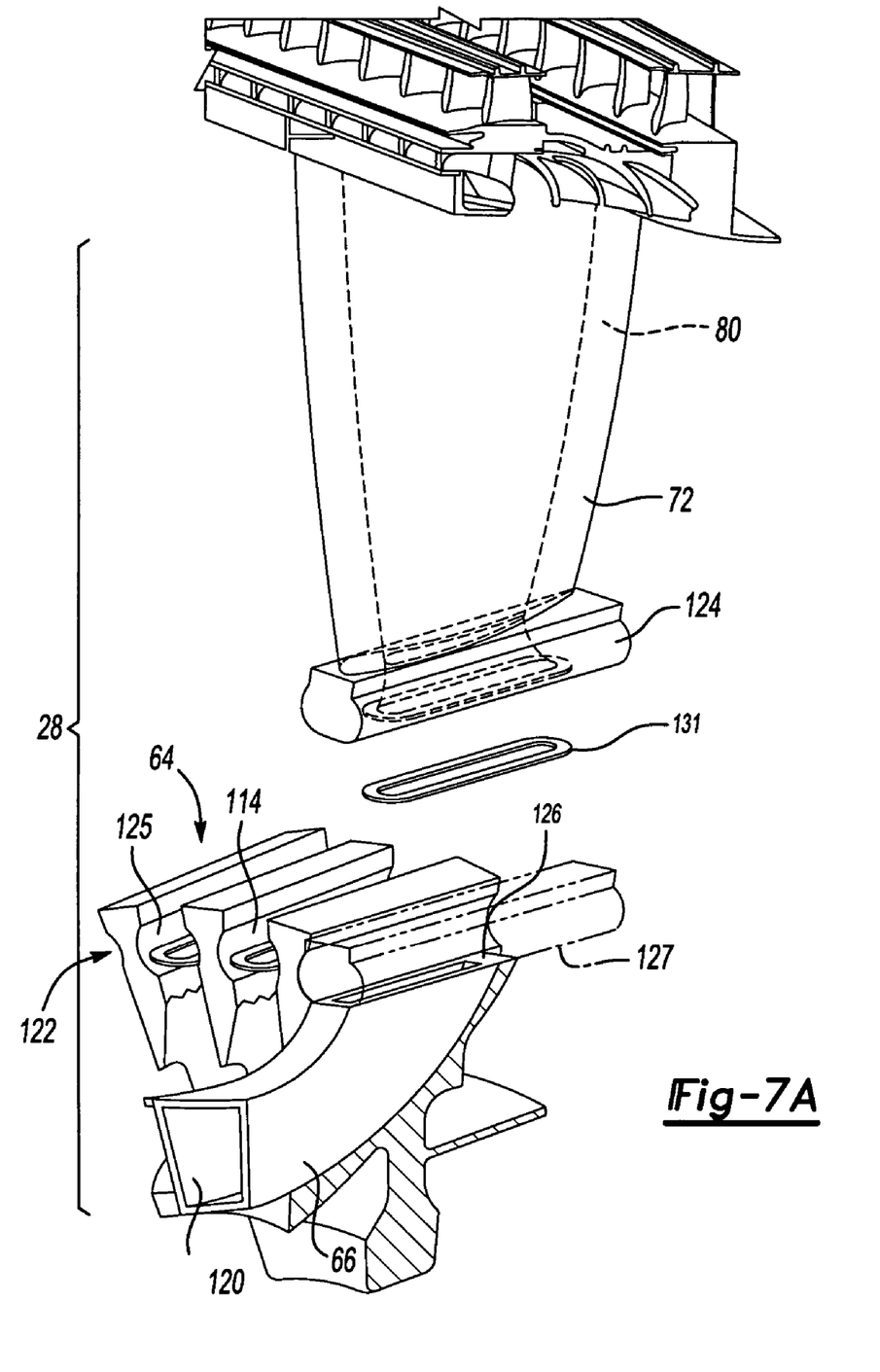
FIG. 7A is an exploded view of a fan blade mounted within a fan-turbine rotor assembly.
Figure 7B:
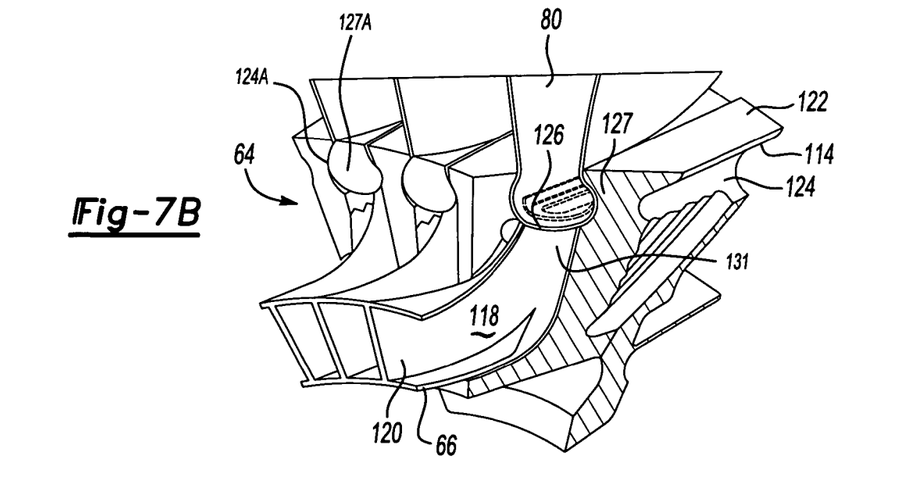
FIG. 7B is a partially fragmented view of a fan blade mounted within a blade receipt section of the fan-turbine rotor assembly of FIG. 7A.

Referring to FIG. 7A, each hollow fan blade section 72 includes an inner fan blade mount 124 that corresponds with the blade receipt section 122 to retain the hollow fan blade section 72 within the fan hub 64 (FIG. 7B). The inner fan blade mount 124 preferably includes a semi-cylindrical portion 127 to radially retain the fan blade 28 through a dove-tail, fir-tree, or bulb-type engagement structure. The fan hub 64 supports the hoop load required to retain the integrity of the disk/blade structure.

The inner fan blade mount 124 is preferably uni-directionally mounted into the blade receipt section 122 from the rear face of the fan hub 64. The inner fan blade mount 124 engages the blade receipt section 122 during operation of the fan-turbine rotor assembly 24 to provide a directional lock therebetween. That is, the inner fan blade mount 124 and the blade receipt section 122 may be frustoconical or axially non-symmetrical such that the forward segments 124a, 127a form a smaller engagement surface than the rear segment 124b, 127b to provide a wedged engagement therebetween when assembled.

Figure 8:
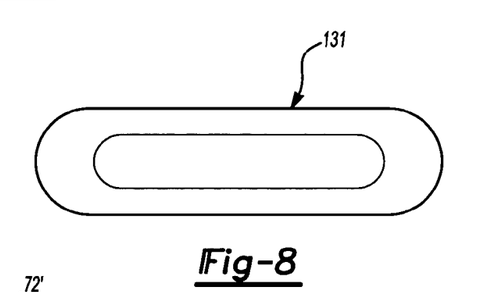
FIG. 8 is a top view of a seal for use with the blade mount of the present invention.

A seal 131 is preferably located between the inner fan blade mount 124 and the blade receipt section 122 to minimize airflow leakage therebetween. The seal 131 (also illustrated in FIG. 8) is generally annular in shape and is preferably manufactured of a thin metal or an elastomer such as Fluro-silicone rubber depending on the expected temperature. It should be understood that various seal shapes may be utilized with the present invention.

Figure 7C:
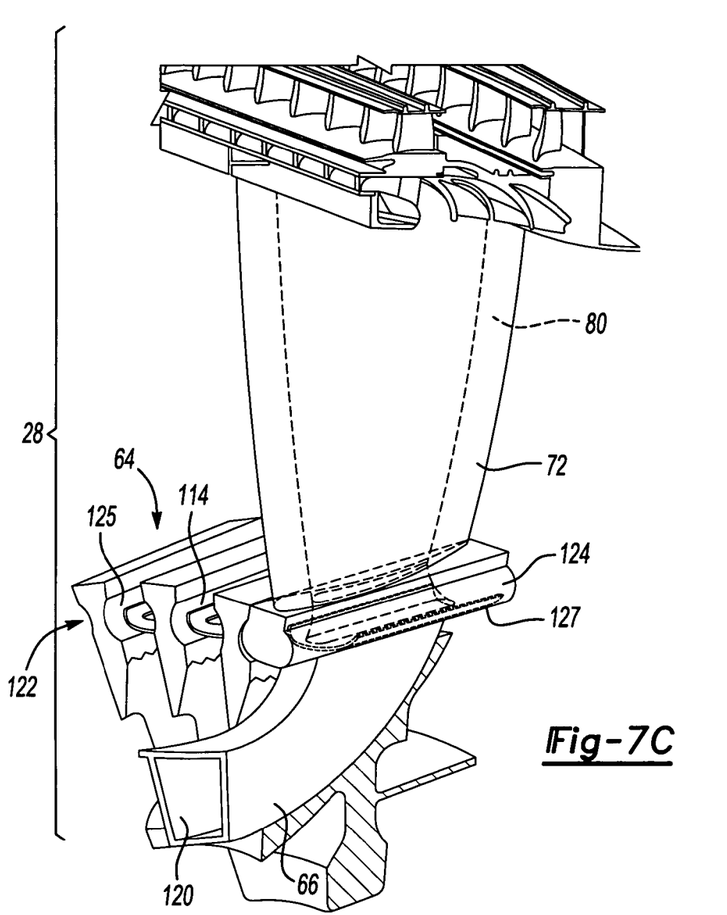
FIG. 7C is a partial sectional view of a fan blade mounted within a fan-turbine rotor assembly.
Figure 7D:
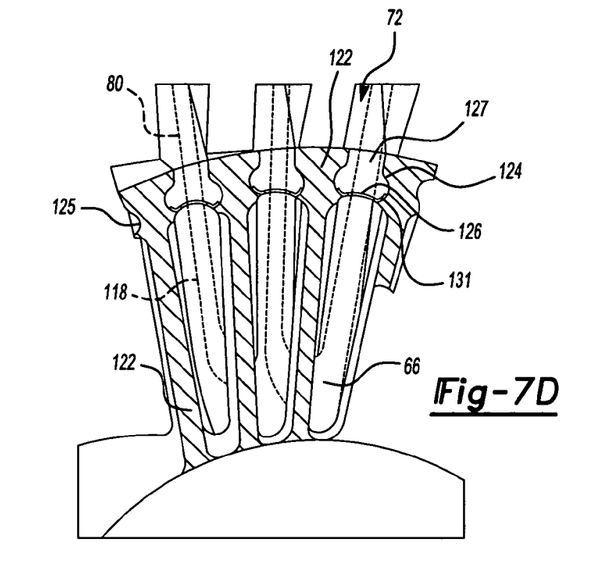
FIG. 7D is a rear sectional view of the engagement between an inducer receipt section, a blade receipt section, an inducer section and a fan blade section.

Referring to FIG. 7C, each inducer section 66 is retained within the fan hub 64 by interaction with the inner fan blade mount 124. That is, the inner fan blade mount 124 engages the inducer exit 126 (FIG. 5) to further retain the inducer sections 66 into the fan hub 64 to provide core airflow communication through the inducer passages 118 and into the core airflow passage 80.

The seal 131 engage the inducer exit 126 of each inducer section 66 to further minimize leakage of airflow from the inducer section 66 into core the airflow passage 80 each hollow fan blade section 72. That is, the seal 131 is in contact with the inducer exit 126, the inner fan blade mount 124 and the blade receipt section 122 to accommodate tolerance variations therebetween and provide a generally air-tight engagement therebetween.

Figure 9A:
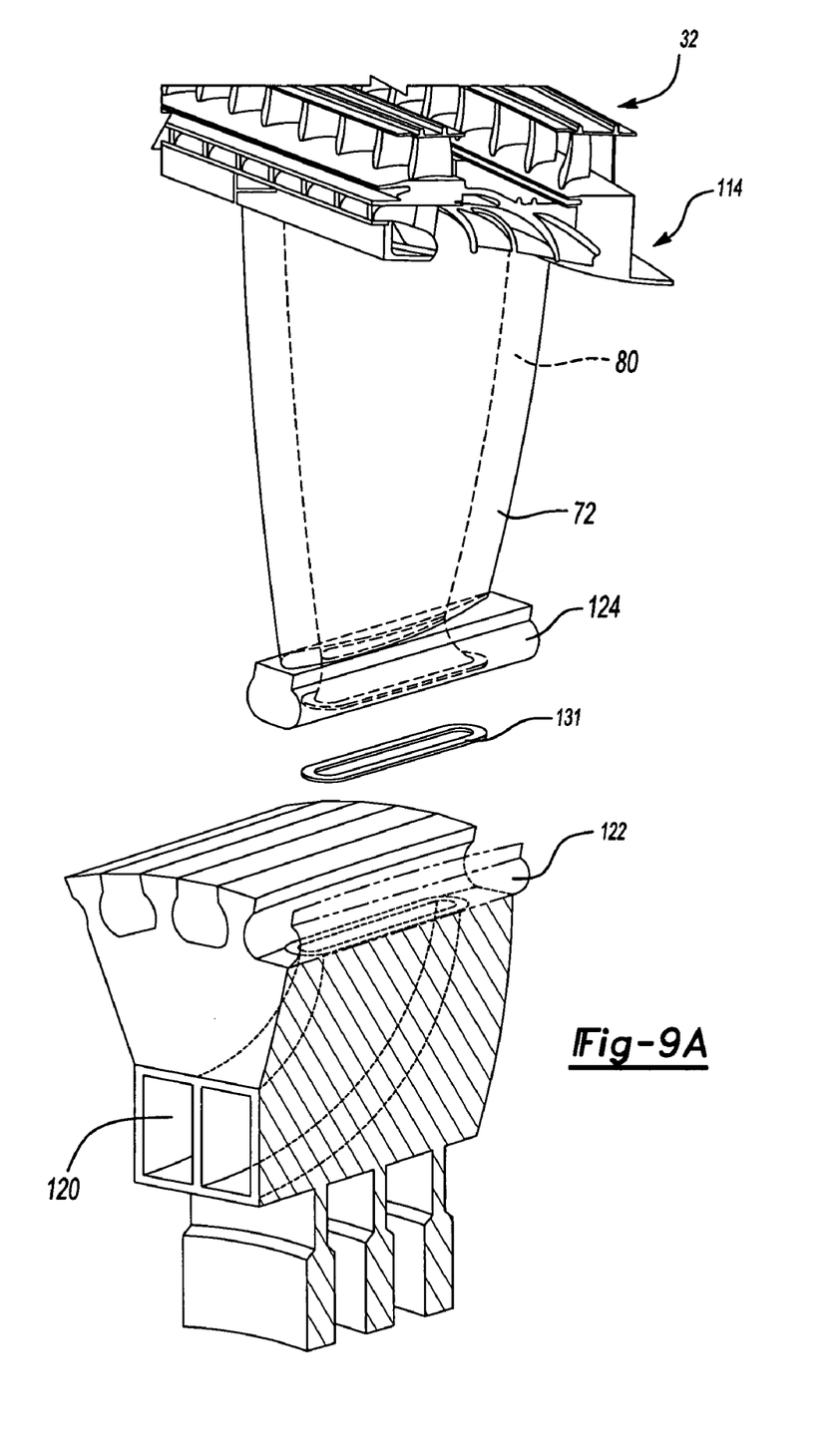
FIG. 9A an exploded view of a fan blade mounted to a hub with an integral inducer section of a fan-turbine rotor assembly.

Referring to FIG. 9A, the fan hub 64' itself forms the multitude of inducer sections 66. Each inducer section 66' formed by the fan hub 64' is essentially a conduit that defines an inducer passage 118' between an inducer inlet section 120' and an inducer exit section 126' which communicates with a blade receipt section 122' as generally described above.

Figure 9B:
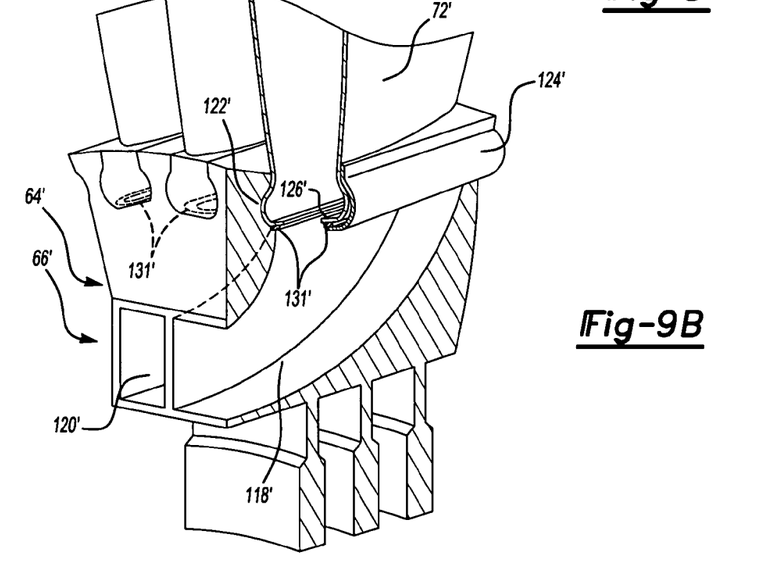
FIG. 9B is a partially fragmented view of a fan blade mounted within a blade receipt section of the fan-turbine rotor assembly of FIG. 9A.
Figure 9C:
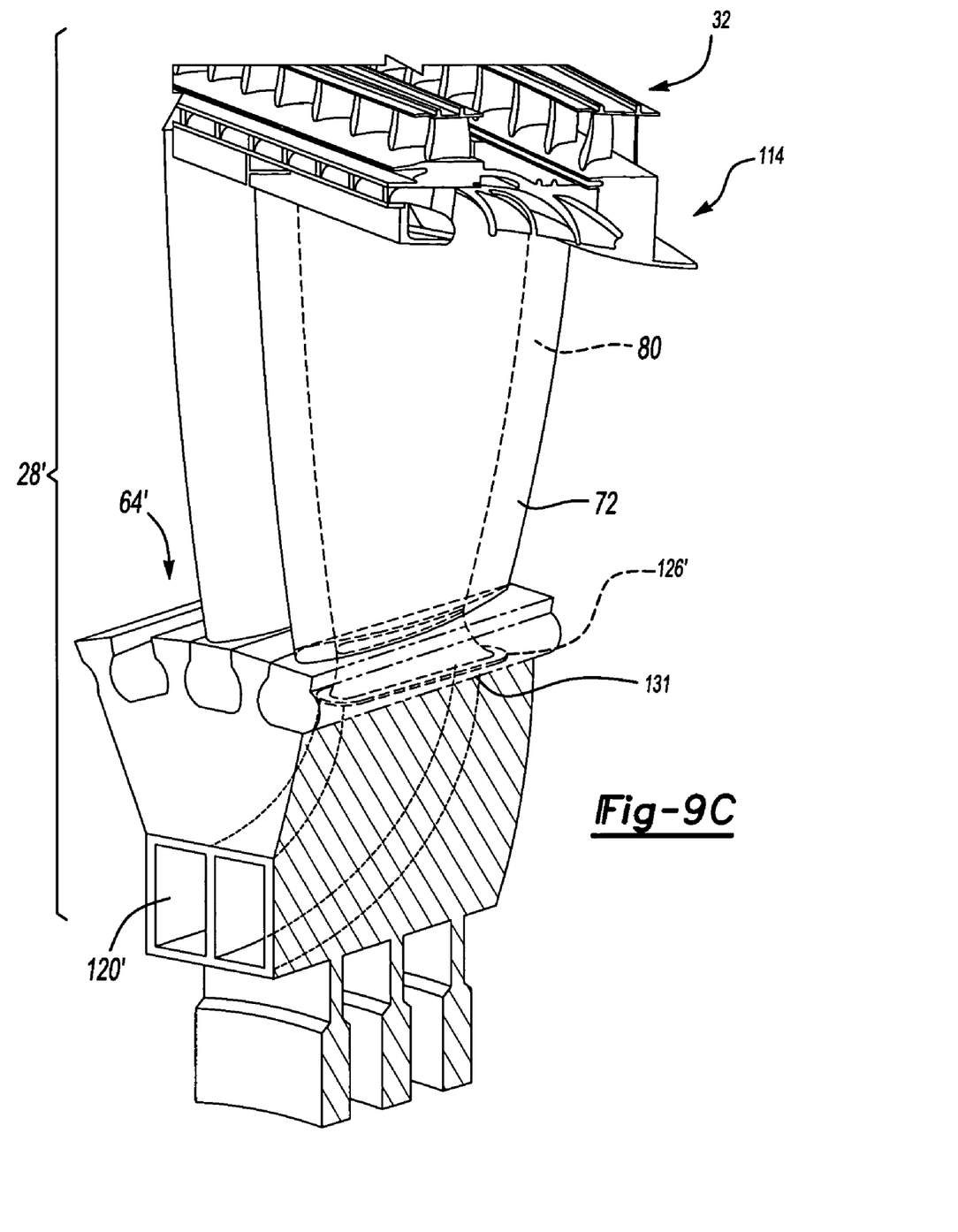
FIG. 9C a partial sectional view of a fan blade mounted to a hub with an integral inducer section of a fan-turbine rotor assembly.

A seal 131' need only seal the blade receipt section 122' formed into the fan hub 64' with the fan blade mount 124' (also illustrated in FIG. 9B). That is, as the inducer section 66' is integral with the fan hub 64', the potential for airflow leakage is minimized.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A fan assembly for a tip turbine engine comprising:
a fan hub defining an axis of rotation, said fan hub defining an elongated opening with a blade receipt section located about an outer periphery of said fan hub;
a fan blade section having an inner fan blade mount engageable with said blade receipt section to retain said fan blade section to said fan hub, said fan blade section defining a fan blade core airflow passage to receive airflow from an inducer passage; and
a seal mountable within each of said elongated openings between said blade receipt section and said fan blade mount.

2. The fan assembly as recited in claim 1, further comprising an inducer section defining said inducer passage, said inducer section receivable within said elongated opening such that said seal contacts said inducer section and said fan blade mount.

3. The fan assembly as recited in claim 1, wherein said seal is generally annular.

4. The fan assembly as recited in claim 3, wherein said seal is oval.

5. The fan assembly as recited in claim 1, further comprising a tip turbine mounted to said fan blade section.

6. The fan assembly as recited in claim 1, wherein said blade receipt section includes a semi-cylindrical engagement.

7. A fan assembly for a tip turbine engine comprising:
a fan hub defining an axis of rotation, said fan hub defining an elongated opening with a blade receipt section located about an outer periphery of said fan hub;
an inducer section at least partially mounted within said elongated opening;

a fan blade section having an inner fan blade mount engageable with blade receipt section to retain said fan blade section to said fan hub, said fan blade section defining a fan blade core airflow passage to receive airflow from an inducer passage; and a seal mountable within each of said elongated openings to contact said inducer section, said blade receipt section and said fan blade mount.

8. The fan hub as recited in claim 7, wherein said inducer section includes an inducer exit, said inducer exit surrounded by said seal.

9. The fan assembly as recited in claim 8, wherein said inner fan blade mount includes a semi-cylindrical portion retained within said blade receipt section, said semi-cylindrical portion located adjacent said seal.

10. The fan hub as recited in claim 9, wherein said semi-cylindrical portion defines axially non-symmetrical engagement surface to provide a wedged engagement with said blade receipt section.

11. A fan assembly for a tip turbine engine comprising:

a fan hub defining an axis of rotation, said fan hub defining an elongated opening with a blade receipt section located about an outer periphery of said fan hub, said elongated opening defining an inducer passage;

a fan blade section having an inner fan blade mount engageable with blade receipt section to retain said fan blade section to said fan hub, said fan blade section defining a fan blade core airflow passage to receive airflow from an inducer passage; and a seal mountable within each of said elongated openings to contact said blade receipt section and said fan blade mount to minimize airflow leakage between said inducer passage and said core airflow passage.

12. The fan assembly as recited in claim 11, wherein said inner fan blade mount includes a semi-cylindrical portion retained within said blade receipt section, said semi-cylindrical portion located adjacent said seal.

13. The fan hub as recited in claim 12, wherein said semi-cylindrical portion defines axially non-symmetrical engagement surface to provide a wedged engagement with said blade receipt section.

* * * * *